US006775405B1

United States Patent
Zhu

(10) Patent No.: US 6,775,405 B1
(45) Date of Patent: Aug. 10, 2004

(54) IMAGE REGISTRATION SYSTEM AND METHOD USING CROSS-ENTROPY OPTIMIZATION

(75) Inventor: Yang-Ming Zhu, Solon, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 702 days.

(21) Appl. No.: 09/676,613

(22) Filed: Sep. 29, 2000

(51) Int. Cl.[7] .............................................. G06K 9/00
(52) U.S. Cl. ...................................... 382/154; 345/419
(58) Field of Search ................................ 382/154, 285, 382/294, 128, 130, 131, 132; 345/419–427; 128/922

(56) References Cited

U.S. PATENT DOCUMENTS

| | | | | | |
|---|---|---|---|---|---|
| 5,761,248 | A | * | 6/1998 | Hagenauer et al. | 375/340 |
| 6,103,350 | A | * | 8/2000 | Grangeat et al. | 428/195.1 |
| 6,266,453 | B1 | * | 7/2001 | Hibbard et al. | 382/294 |
| 6,306,091 | B1 | * | 10/2001 | Sumanaweera et al. | 600/443 |
| 6,393,157 | B1 | * | 5/2002 | Miller | 382/254 |
| 6,514,082 | B2 | * | 2/2003 | Kaufman et al. | 434/262 |
| 6,539,351 | B1 | * | 3/2003 | Chen et al. | 704/236 |
| 6,591,235 | B1 | * | 7/2003 | Chen et al. | 704/236 |
| 2003/0065478 | A1 | * | 4/2003 | Takeuchi et al. | 702/181 |

OTHER PUBLICATIONS

Maintz et al., "Survey of medical image registration," *Medical Image Analysis*, vol. 2(1), pp. 1–36 (1998).

Van den Elsen et al., "Medical image matching—a review with classification," *IEEE Eng. Med. Biol.*, vol. 12, pp. 26–39 (Mar. 1993).

Maurer et al., "A review of medical image registration," in Maciunas (Ed.), *Interactive Image–Guided Neurosurgery*, Parkridge, IL: Amer. Assoc. Neurological Surgeons, pp. 17–44 (1993).

West et al., "Comparison and evaluation of retrospective intermodality brain image registration techniques," *J. Computer Assisted Tomography*, vol. 21, pp. 554–566 (1997).

Fitzpatrick et al., "Visual Assessment of the accuracy of retrospective registration of MR and CT images of the brain," *IEEE Trans. Med. Imag.*, vol. 17(4), pp. 571–585 (Aug. 1998).

West et al., "Retrospective intermodality registration techniques for images of the head: Surface–based versus volume–based," *IEEE Trans. Med. Imag.*, vol. 18(2), pp. 144–150 (Feb. 1999).

(List continued on next page.)

Primary Examiner—Bhavesh M. Mehta
Assistant Examiner—Aaron Carter
(74) Attorney, Agent, or Firm—Fay, Sharpe, Fagan, Minnich & McKee, LLP

(57) ABSTRACT

An image registration system and method employs a registration processor (130) to find an optimal registration of two volumetric images (110, 112) by finding a spatial orientation that optimizes the statistical measure cross-entropy. The cross-entropy can be minimized where one or more likely or reasonably good a priori estimations of the true joint probability density function (pdf) of voxel value pairs are available. Where such an estimate is not available, the joint pdf for one or more known incorrect spatial arrangements (e.g., based on prior misregistrations), can be used as the prior pdf estimate(s). Since the prior pdf estimate(s) are unlikely to be the true pdf, a spatial orientation maximizing the cross-entropy is found. Likely and unlikely prior pdf estimations can also be used together to register images. The transformation that optimizes the cross entropy provides an optimal registration, and the parameters for the optimized transform are output to memory (150) for use by a display system (160) in aligning the images for display as a fused or composite image.

24 Claims, 7 Drawing Sheets

OTHER PUBLICATIONS

Shore et al., "Axiomatic derivation of the principle of maximum entropy and the principle of minimum cross–entropy," *IEEE Trans. Info. Theory*, vol. 26(1), pp. 26–37 (1980).

Johnson et al., "Comments on and correction to 'Axiomatic derivation of the principle of maximum entropy and the principle of minimum cross–entropy,'" *IEEE Trans. Infor. Theory*, vol. 29(6), pp. 942–943 (Nov. 1983).

Shore et al., "Properties of cross–entropy minimization," *IEEE Trans. Infor. Theory*, vol. 27(4), pp. 472–473 (Jul. 1981).

Shore, "Minimum cross–entropy spectral analysis," *IEEE Trans. Acous., Speech, and Signal Processing*, vol. 29(2), pp. 230–237 (1981).

Zhuang et al., "Minimum cross–entropy algorithm (MCEA) for image reconstruction from incomplete projection," *SPIE*, vol. 1606, pp. 697–704 (1991).

Yee, "Reconstruction of the antibody–affinity distribution from experimental binding data by a minimum cross–entropy procedure," *J. Theor. Biol.*, vol. 153(2), pp. 205–227 (Nov. 1991).

Studholme et al., "Auomatic three–dimensional registration of magnetic resonance and positron emission tomography brain images by multiresolution optimization of voxel similarity measures," *Med. Phys.*, vol. 24(1), pp. 25–35 (Jan. 1997).

Penney et al., "A comparison of similarity measures for use in 2D–3D medical image registration," *IEEE Trans. Med. Imag.*, vol. 17(4), pp. 586–595 (1998).

Collignon et al., "3D multi–modality medical image registration using feature space clustering," in Ayache (Ed.), *Computer Vision, Virtual Reality and Robotics in Medicine*, Berlin: Springer Verlag, pp. 195–204 (1995).

Wells, III, et al., "Multi–modal volume registration by maximization of mutual information," *Medical Image Analysis*, vol. 1(1), pp. 35–51 (1996).

Maes et al., "Multimodality image registration by maximization of mutual information," *IEEE Trans. Med. Imag.*, vol. 16(2), pp. 187–198 (Apr. 1997).

Meyer et al., "Demonstration of accuracy and clinical versatility of mutual information for automatic multimodality image fusion using affine and thin–plate spline warped geometric deformations," *Medical Image Analysis*, vol. 1(3), pp. 195–206 (1996).

Kim et al., "Mutual information for automated unwarping of rat brain autoradiographs," *Neuroimage*, vol. 5, pp. 31–40 (1997).

Maes et al., "Comparative evaluation of multiresolution optimization strategies for multimodality image registration by maximization of mutual information," *Med. Image Anal.*, vol. 3(4), pp. 373–386 (1999).

Studholme et al., "An overlap invariant entropy measure of 3D medical image alignment," *Pattern Recognition*, vol. 32, pp. 71–86 (1999).

Ritter et al., "Registration of stereo and temporal images of the retina," *IEEE Trans. Med. Imag.*, vol. 18(5), pp. 404–418 (May 1999).

Alwan et al., "Information theoretic framework for process control," *European J. Operational Research*, vol. 111(3), pp. 526–542 (Dec. 1998).

Das et al., "Constrained non–linear programming: A minimum cross–entropy algorithm," *Engineering Optimization*, vol. 31(4), pp. 479–487 (1999).

Antolin et al., "Minimum cross–entropy estimation of electron pair densities from scattering intensities," *Phys. Lett. A*, vol. 26, pp. 247–252 (Sep. 1999).

Press et al., *Numerical Recipes in C: the Art of Scientific Computing* (2nd ed.), Cambridge: Cambridge Univ. Press, pp. 412–419 (1999).

Roche et al., "Towards a better comprehension of similarity measures used in medical image registration," in *Medical Image Computing and Computer–Assisted Intervention—MICCAI'99*, Taylor et al. (Eds.), Berlin: Springer–Verlag, pp. 555–566 (1999).

Gonzalez et al., *Digital Image Processing*, Reading, MA: Addison–Wesley, pp. 324–331 (1992).

Azarm, *Solving Multiobjective Optimization Design Problems: Copyright Azarm 1996*, (last modified May 27, 1997) <http://www.glue.umd.edu/~azarm/optimum_notes/multi/multi_solving.html>.

Foley et al., *Computer Graphics: Principles and Practice* (2nd ed.), Addison–Wesley, pp. 212–217 (1996).

Boes et al., "Multi–variate mutual information for registration," in *Medical Image Computing and Computer–Assisted Intervention—MICCAI'99*, Taylor et al. (Eds.), Springer–Verlag, pp. 606–612 (1999).

Zhu, et al. "Volume Image Registration by Cross–Entropy Optimization," (unpublished manuscript).

Viola, et al., "Alignment by Maximization of Mutual Information", Compter Vision, 1995, Proceed. Fifth Int'l. Conf. on Cambridge, MA US Los Alamitos, CA IEEE Comput. Soc. US 1995–06–20, pp. 16–23 (XP010147090).

Maes, et al., "Multimodality Image Registration by Maximization of Mutual Information", IEEE Trans. on Med. Imaging, IEEE, NY US V. 16, No. 2, 1997–04–01, pp. 187–198 (XP000685807).

Studholme, "Automated 3–D Registration of MR and CT Images of the Head", Med. Image Analysis, Oxford Univ. Press, Oxford GB V. 1, No. 2, 1996 pp. 163–175 (XP002942556).

Maintz, et al., "A Survey of Medical Image Registration", Med. Image Analysis, Oxford Univ. Press, Oxford GB V. 2, No. 1, 1998 pp. 1–37 (XP001032679).

\* cited by examiner

IMAGE REGISTRATION SYSTEM AND METHOD USING CROSS-ENTROPY OPTIMIZATION

BACKGROUND OF THE INVENTION

The present invention relates to image processing systems and methods and, more particularly, to image registration systems that combine two or more images into a composite image. The present invention finds particular application in the field of medical imaging, however, it will be appreciated that the present invention is also applicable to other types of imaging systems in which multiple images are correlated and :combined into a composite image.

The acquisition of volume images via a variety of imaging modalities is well known in the medical field. Such modalities include, for example, magnetic resonance imaging (MRI) techniques, x-ray computed tomography (CT), nuclear imaging techniques such as positron emission tomography (PET) and single photon emission computed tomography (SPECT), ultrasound, and so forth. Volume images so acquired are typically stored digitally, e.g., in a computer memory, as arrays of voxel values. Each voxel is associated with a location in 3D space (e.g., x, y, and z coordinates), and is assigned a color value, typically a gray scale intensity value.

Image fusion, or the combination of multiple associated images to form a composite image integrating the data therefrom, is often desirable in a clinical setting. In many cases, combined images might provide insights to the diagnostician that could not be obtained by viewing the images separately. Multi-modality image fusion is often useful since different imaging modalities provide information that tends to be complimentary in nature. For example, computed tomography (CT) and magnetic resonance (MR) imaging primarily provide anatomic or structural information while single photon emission computed tomography (SPECT) and positron emission tomography (PET) provide functional and metabolic information. The combination of a functional or metabolic image with a structural or anatomical image aids in localizing the functional image, thus improving diagnostic accuracy. For example, in the area of oncology, precise positioning of localization of functional images enables a clinician to assess lesion progression and/or treatment effectiveness. Also, such diagnostic studies are used in surgical and/or radiotherapeutic planning, where precise positioning is necessary to minimize the effect on healthy cells surrounding the target cells. It is also desirable at times to combine images from the same modality. For example, it may be desirable to combine the results of multiple MR scans, such as an MR angiograph, a contrast-enhanced MR image, or a functional MRI (fMRI) image, with another MR image, such as an anatomical MR image.

For the meaningful integration of data from multiple images, it is important that the images be properly registered. Image registration involves bringing the images into spatial alignment such that they are unambiguously linked together. A number of image registration techniques are known in the art.

One image registration technique requires that an individual with expertise in the structure of the object represented in the images label a set of landmarks in each of the images that are to be registered. The two images are then registered by relying on a known relationship among the landmarks in the two images. One limitation of this approach to image registration is that the registration accuracy depends on the number and location of landmarks selected. Selecting too few landmarks may result in an inaccurate registration. Selecting too many landmarks does not necessarily guarantee accurate registration, but it does increase the computational complexity of registration. Also, the manual operations required are time consuming. Furthermore, it is not always possible to identify appropriate structural landmarks in all images.

Recently, two different imaging modalities have been combined in a single imaging device. This integrated hardware approach to image registration is a less than optimal solution to the problem of image registration due to cost and logistical reasons. In many cases, hardware registration is impractical or impossible and one must rely on software-based registration techniques. For example, such a hardware approach is not applicable to the registration of images acquired at different times or from different subjects, e.g., when monitoring treatment effectiveness over time, or for applications involving inter-subject or atlas comparisons. Software registration would also be necessary in some cases, even if a hardware-based approach to registration is used. For example, software registration would be needed for the correction of motion that occurs between sequential scans taken on the same machine, such as transmission and emission scans in PET and SPECT, and for the positioning of patients with respect to previously determined treatment plans.

In recent years, full volume-based registration algorithms have become popular since they do not rely on data reduction, require no segmentation, and involve little or no user interaction. More importantly, they can be fully automated and provide quantitative assessment of registration results. Entropy-based algorithms, the mutual information approach in particular, are among the most prominent of the full volume-based registration algorithms. Most of these algorithms optimize some objective function that relates the image data from two modalities. However, these techniques are limited because they lack a systematic way of taking into account a priori knowledge of the image pairs to be registered and for combining multiple prior estimations.

Cross-entropy (CE), also known as relative entropy and Kullback-Leibler distance, is a measure quantifying the difference between two probability density functions of random variables. Although cross-entropy has been applied to areas including spectral analysis, image reconstruction, biochemistry, process control, non-linear programming, and electron density estimation, among many others, cross-entropy as a measure has not heretofore been applied to image registration.

Accordingly, the present invention contemplates a new and improved image processing system and method which overcome the above-referenced problems and others.

SUMMARY OF THE INVENTION

In accordance with a first aspect, a method for registering first and second volume images, each image comprising a three-dimensional array of gray scale voxel values, is provided. One or more prior voxel value joint probability density functions are determined for the first and second images to provide a corresponding one or more prior pdf estimates. A transform defining a geometric relationship of the second image relative to the first image is selected and a measure of the cross-entropy for the selected geometric relationship is calculated using the one or more prior pdf estimates. The cross-entropy calculation is then repeated in iterative fashion for a plurality of different transform until an optimal transform, corresponding to a geometric relationship providing an optimized measure of the cross-entropy, is calculated.

In another aspect, an image processing system for registering first and second volumetric images includes a registration processor and associated memory for storing a plurality of volumetric image representations to be registered, the registration processor (1) determining one or more prior joint probability density functions for the first and second images to provide a corresponding one or more prior probability density function (pdf) estimates; (2) calculating a measure of the cross-entropy for a plurality of geometric relationships between the first and second images using the one or more prior pdf estimates; and (3) optimizing the measure of the cross-entropy to find an optimal transform defining a geometric relationship between the first and second images. The image processing system further includes a memory coupled to the registration processor for storing parameters representative of the optimal transform and a display system for forming a composite image representation from the first and second images.

In another aspect, a computer readable medium having contents for causing a computer-based information handling system to perform steps for registering a first volumetric image and a second volumetric image, the steps comprising: determining one or more prior joint probability density functions for the first and second images to provide a corresponding one or more prior probability density function (pdf) estimates; selecting a first transform defining a geometric relationship of the second image relative to the first image; calculating a measure of the cross-entropy for the geometric relationship using the one or more prior pdf estimates; selecting a different transform defining a geometric relationship of the second image relative to the first image; and iteratively repeating the steps of calculating a measure of their cross-entropy and selecting a different transform until an optimal transform corresponding to a geometric relationship providing an optimized measure of the cross-entropy is calculated.

One advantage of the present invention is that it does not use data reduction and requires no segmentation or user interactions.

Another advantage of the present invention is that it provides flexibility in the number and kinds of prior probability density function estimations that can be used.

Another advantage of the present invention is that its accuracy and robustness are comparable to, and in some cases better than, prior art techniques.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
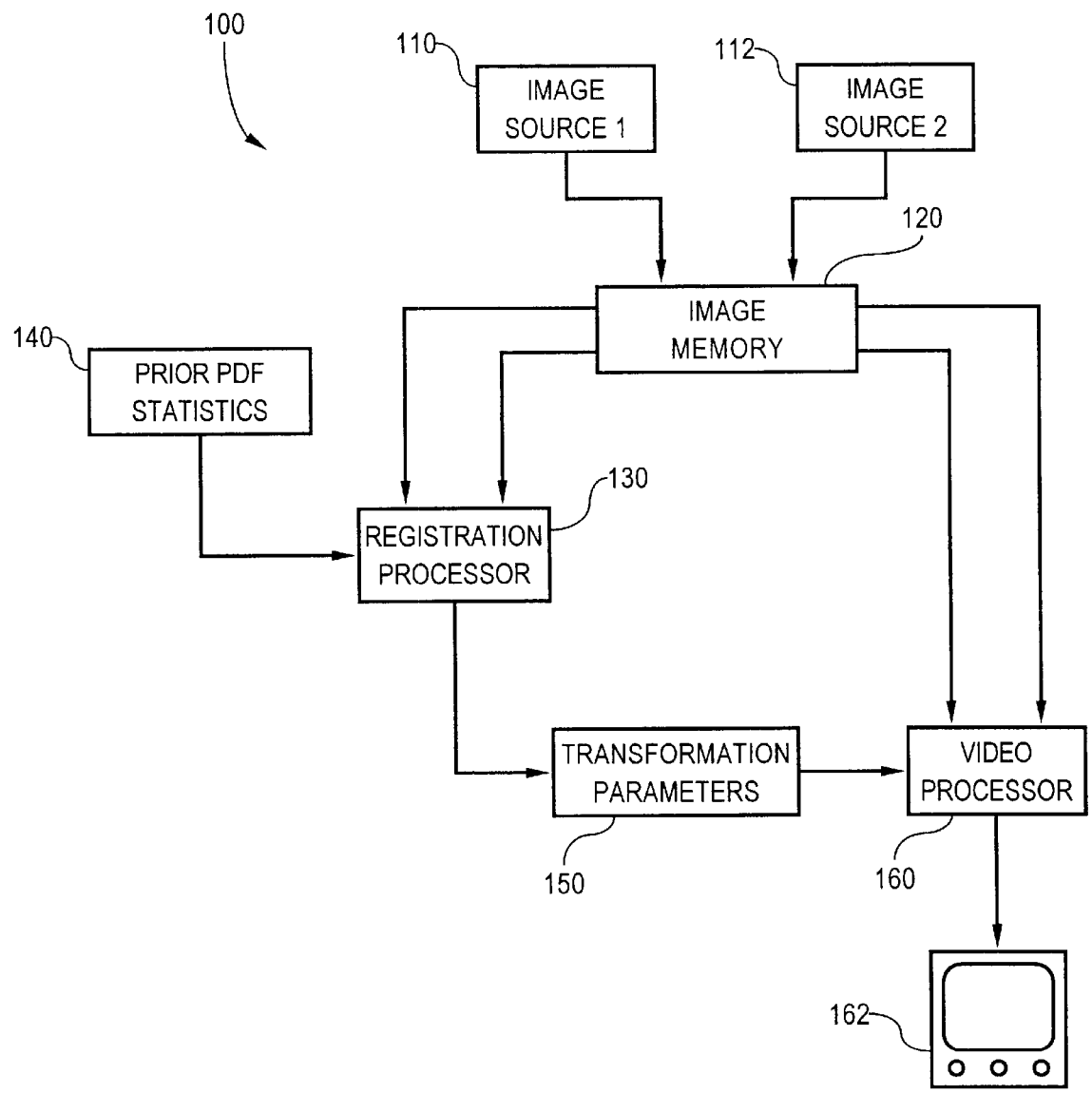
FIG. 1 is a block diagram of an image capture and processing system according to the present invention.

The cross-entropy can be defined for probability density functions of any-dimensional random variables. For the present image registration system and method, a vector variable (u, v) is considered, where u and v are voxel gray scale or intensity values at the corresponding points of two images, f(x, y, z) and g(x, y, z).

The present invention requires that there is some prior information about the involved images. Specifically, the prior information is one or more estimates of the joint voxel value probability density function (pdf) of the two images. This prior pdf estimate can either be a likely pdf estimate or an unlikely pdf estimate. A prior pdf estimate is referred to as "likely" if it can reasonably be expected to be close to the "true" (but, in the case of image registration, unknown) pdf, the true pdf being the joint pdf of the images when aligned correctly, i.e., in accordance with the true (but, again, unknown in the case of image registration) relationship between the two images. A likely prior pdf estimate can be determined, for example, from the joint distribution of voxel values for a previous registration, e.g., a manual or software registration in which the images appear to be close to proper alignment. When a likely prior pdf is used, a spatial orientation that minimizes cross-entropy is sought.

A prior pdf estimate is referred to as "unlikely" if can reasonably be expected not to be close to the true pdf, i.e., likely to be a poor estimate of the true pdf. An unlikely prior pdf is based on a spatial orientation defining conditions under which the images are definitely not, or unlikely to be, related. An unlikely prior pdf estimate can be obtained from the joint distribution of the voxel values for a misalignment, for example, from a prior registration attempt resulting in misregistration. Also, unlikely prior pdf estimates can be calculated from randomly selected spatial orientations of the images. When an unlikely prior pdf is used, a spatial orientation that maximizes cross-entropy is sought.

Three special cases can arise when an unlikely prior pdf is used. The first special case arises when the unlikely pdf is a uniform distribution, and cross-entropy maximization reduces to joint entropy minimization. The second special case arises when the unlikely pdf is proportional to one of the marginal distributions, in which case cross-entropy maximization reduces to conditional entropy minimization. The third special case results when the unlikely distribution is the product of the two marginal distributions, in which case cross-entropy maximization degenerates to mutual information maximization.

In certain embodiments, each of the different cross-entropies are optimized individually, and the individually optimized cross-entropies are considered separately as criteria for image registration. In alternative embodiments, two or more of the different cross-entropies are considered together as criteria for image registration, using a multiobjective optimization scheme, e.g., by optimizing the sum and/or difference of the cross-entropy values.

With reference to FIG. 1, an image processing system 100 includes a first image source 110 and a second image source 112 for acquiring and/or storing volumetric image data. The first and second image sources 110 and 112 are preferably medical diagnostic imaging scanners, such as MR scanners, x-ray CT scanners, nuclear cameras (e.g., PET and/or SPECT scanners), ultrasound scanners, and the like, and associated image memories. The first and second image sources 110 and 112 may be of the same or different imaging modality, and may be obtained from different scanning hardware or from the same hardware. For example, the first and second image sources 110 and 112 can be a single apparatus including plural imaging modes. Also, the first and second image sources 110 and 112 can be a single apparatus wherein plural images are acquired at different times.

In certain embodiments, both of the first and second image sources 110 and 112 includes sensors, data acquisition circuitry, and image reconstruction circuitry as appropriate for generating the images to be registered, as is well known to those skilled in the art pertaining to diagnostic imaging. However, in other contemplated embodiments, one or both of the image sources 110 and 112 may be a previously acquired image, for example, an image representation that has been saved in an electronic memory or computer readable storage medium, such as computer memory, random access memory (RAM), disk storage, tape storage, or other magnetic or optical medium, at a storage location on a computer network, other sources of archived images, and the like. Thus, although the image processing system of the present invention may be interfaced directly to the scanning hardware that acquired one or both of the images to be registered, it is not necessary that it is so.

The image processing system 100 further includes an image memory 120 for storing image data from the image sources 110 and 112. A registration processor 130 reads the two volume images from the image memory 120 and registers the images using a cross-entropy optimization algorithm to produce a registration transformation matrix relating the two images, the cross-entropy being a measure quantifying the difference between two pdf's of random variables. An optional memory 140 is provided for storage of prior pdf statistics of the two images for calculating one or more prior pdf estimates. Alternatively, the prior pdf can be calculated from the image data, for example, if the prior pdf is related to the marginal pdf of one or both of the input images, or otherwise related to the images under study. The cross-entropy is calculated using this prior pdf estimate, and an optimal registration is found iteratively calculating the cross-entropy for a plurality of registration or transformation parameters, using an optimization routine, until the cross-entropy is optimized. Conventional optimization techniques are used, including, for example, those described by Press et al., *Numerical Recipes in C: the Art of Scientific Computing* (2nd ed.), Cambridge: Cambridge Univ. Press, 1999, Chapter 10.

Again, when a likely prior pdf estimate is used, the optimal registration is determined by iteratively determining the transform that minimizes the cross-entropy. When an unlikely prior pdf estimate is used, the optimal registration is determined by iteratively determining the transform that maximizes the cross-entropy.

The optimized registration transformation matrix is stored in a memory 150. The registration transformation matrix, so determined, is used by a display or video processor 160 to align the two images read from the image memory 120 and display them on computer or other human-readable display 162 as a composite image as prescribed by the registration transformation matrix. Standard data processing and programming techniques are used to store images and associated matrices, as well as likely or unlikely pdfs, segmentation limites, etc., with the appropriate images, such as indexing, the use of pointers, and the like.

As an alternative to or in addition to storing the transformation matrix, once the optimal registration is determined, a composite image is formed from the two images and stored in the image memory 120. However, it is generally preferred to store the transformation matrix. Also, one image can be reformatted in the space of another image based on the registration parameters and then stored.

Image registration for purposes other than image fusion is also contemplated. For example, image registration in accordance with this teaching may be performed for multiple partially overlapping images for the purpose of generating a single larger volume image therefrom.

In certain embodiments, the registration processor 130 and the display processor 160 are implemented in software on a conventional computer coupled to a conventional display.

Figure 2:
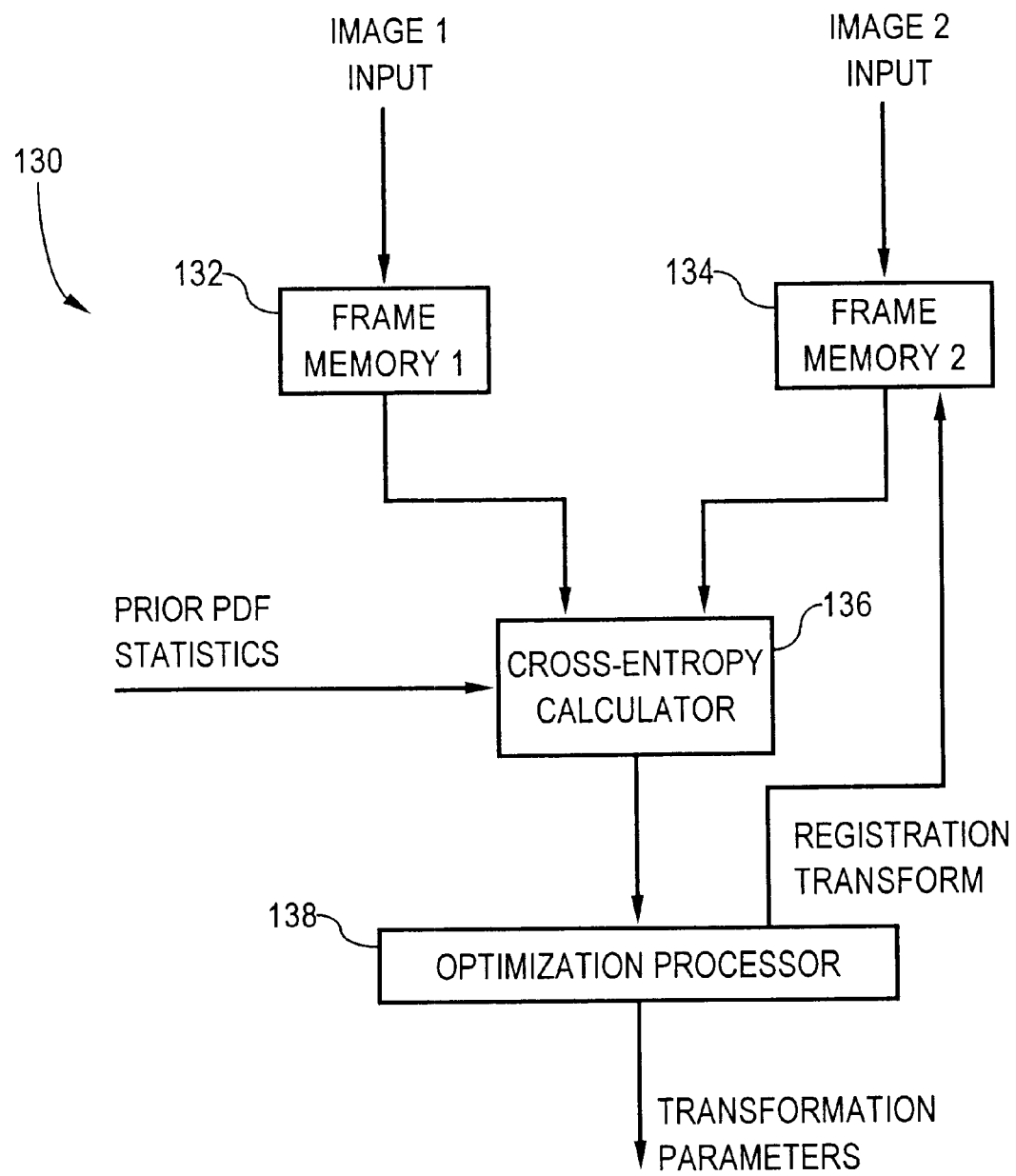
FIG. 2 is a block diagram illustrating the various modules of a software implementation of a volume image registration program according to the present invention.

Referring now to FIG. 2, a module diagram of the registration processor 130 is illustrated. As shown in FIG. 1, the inputs to the registration processor 130 are the first and second images 110 and 112 to be registered and prior pdf statistics from memory 140. The output of registration processor 130 is a set of registration parameters 150, i.e., the coefficients of a transformation matrix which, when applied to one of the images, will transform that image relative to some fixed coordinate system to bring the two images into alignment.

The registration processor 130 includes frame memories 132 and 134, a cross-entropy calculator 136 and an optimization processor 138. The cross-entropy calculator 136 and optimization processor 138 can be modules of an integrated processing system or, alternatively, can be distributed over multiple processors to obtain the benefits of parallel processing. In operation, the registration processor 130 reads two images into the frame memories 132 and 134 and calculates a cross-entropy value for the current registration. The optimization processor 138 then transforms the image in the frame memory 134 and the cross-entropy is again calculated by the cross-entropy calculator 136. The steps are iteratively repeated until the cross-entropy is optimized and the transformation parameters for the registration providing the optimal cross-entropy are output to the memory 150.

The cross-entropy, calculated by cross-entropy calculator 136, can be calculated by a number of methods, as described below. The calculation used depends on the type of prior information available about the relationship between the involved images.

The joint pdf of random variables (u, v) is assumed to be p(u, v). Also, a prior estimation, q(u, v), of the pdf is assumed to be available. The cross-entropy is thus defined on a compact support $D=D_u \times D_v$ (where $D_u$ and $D_v$ are supports of u and v, respectively) as:

$$\eta(p, q) = \int_D p(u, v) \log \frac{p(u, v)}{q(u, v)} \, du \, dv. \qquad (1)$$

It is noted that given a prior estimation of the true pdf and a set of observations on the true pdf, one can find an optimal estimation of the true pdf by minimizing the above defined cross-entropy, subject to the observations. However, in the image registration context, one does not have any observations on the true pdf. Therefore, some estimate of the pdf must be used.

In a first aspect, a system and method employing cross-entropy minimization is provided. A prior estimation q is based on previous statistics on (u, v) of two registered images. In such a case, different relative transformations of the images give different estimations of the true joint pdf. Using one of the conventional optimization algorithms, the estimated joint pdf is calculated for a plurality of transformations in iterative fashion, until the transformation providing an estimation of the joint pdf which minimizes the cross-entropy, as defined in Eq. 1, is found. This transformation is regarded as providing an optimal registration.

In a further aspect of the present invention, a system and method using cross-entropy maximization is provided. In this aspect, a prior estimation that is likely to be close to the true pdf is not necessary. For example, in some cases, a priori knowledge is not available. In other cases, prior information may be available but not applicable, e.g., where the prior pdf estimate is image-content dependent, as is the case for nuclear medicine images (such as PET and SPECT images) in which the voxel value is proportional to the acquisition time.

For cross-entropy maximization, some conditions are identified in which the two images are definitely not, or are unlikely to be, related (or in which they are related, but not in the expected way). Their joint pdf's under such conditions are calculated and used as undesirable, unexpected, or unlikely prior estimates. Different relative transformations of the images are examined and the transformation providing an estimation of the joint pdf which maximizes the cross-entropy, i.e., in which the pdf differs, in terms of cross-entropy, from the unlikely prior pdf's by as much as possible.

A first undesirable pdf may be a uniform distribution. Assuming that the pdf is q=c, satisfying $$\int_D c\,du\,dv = 1,$$

and substituting q into Eq. 1, gives:

$$\eta_1(p, q) = \int_D p(u, v)\log p(u, v)\,du\,dv - \log c. \quad (2)$$

Maximizing Eq. 2 is equivalent to minimizing $$H(U, V) = \int_D p(u, v)\log p(u, v)\,du\,dv,$$

which is the entropy of the joint pdf. H is used to denote the entropy of random variable(s).

If the voxel gray values in two images are statistically independent, these two images can not be registered since there is no ground for registration. Statistically, the voxel values are independent if and only if the joint pdf is the product of their marginal pdf's. Assume the marginal pdf's of u and v are $h_f(u)$ and $h_g(v)$ respectively. Putting $q=h_f(u)h_g(v)$ into Eq. 1, one arrives at $$\eta_2 = \int_D p(u, v)\log\frac{p(u, v)}{h_f(u)h_g(v)}\,du\,dv, \quad (3)$$

which is the definition of mutual information. That is to say, maximizing the cross-entropy under this prior estimation reduces to the maximization of mutual information.

When two images are registered, one wants to use one image to interpret the other image. If neither image can account for the other image, they cannot be registered. If the joint pdf is proportional to the marginal pdf $h_f(u)$, i.e., $q=c_g h_f(u)$, where $$\int_D c_g\,dv = 1,$$

image f cannot be used to interpret image g since a voxel value in f can correspond to any voxel value in image g with equal probability. To avoid that case, the cross-entropy is maximized:

$$\eta_3 = \int_D p(u, v)\log\frac{p(u, v)}{h_f(u)c_g}\,du\,dv. \quad (4)$$

Eq. 4 can be reduced to $$\eta_3 = \int_D p(u, v)\log p(u|v)\,du\,dv - \log c_g = -H(V|U) - \log c_g.$$

Thus, maximizing Eq. 4 is equivalent to minimizing the conditional entropy H(V|U).

Similarly, one can also maximize $$\eta_4 = \int_D p(u, v)\log\frac{p(u, v)}{c_f h_g(v)}\,du\,dv, \quad (5)$$

where $$\int_{D_u} c_f\,du = 1.$$

Maximizing Eq. 5 is equivalent to minimizing the conditional entropy H(U|V).

Each of these cross-entropies, $\eta_1$, $\eta_2$, $\eta_3$, and $\eta_4$, can be maximized independently to seek an optimal registration. Alternatively, any combination of $\eta_1$, $\eta_2$, $\eta_3$, and $\eta_4$ can be maximized. Where a combination of these cross-entropies are to be optimized, a multiobjective optimization approach can be used. To simplify the matter, the equally-weighted sum is used, although multiobjective optimization using weighting of the objectives is also contemplated.

For example, to make both images interpret each other well, $\eta_3$ and $\eta_4$ can be added, i.e., $$\eta^{0011} = \eta_3 + \eta_4. \quad (6)$$

Here the superscript works like a bit pattern and if the bit is set, the corresponding cross-entropy is included. According to the image resolution and other image-related factors, they may be weighted differently. If it is required that the true pdf be different from the latter three cases, then $$\eta^{0111} = \eta_2 + \eta_3 + \eta_4. \quad (7)$$

$\eta^{0011}$ or $\eta^{0111}$ can be maximized to seek the optimal registration under these requirements. Note that $\eta^{1111}$ is equivalent to $\eta^{0011}$.

As can be seen, no matter which type of prior estimation is used, the cross-entropy to be optimized has a similar structure. Thus, they can be implemented in the same way, and the discussion herein applies to them equally well. Since the formulas given are in a continuous form, they must be discretized to be solved numerically.

Figure 3:
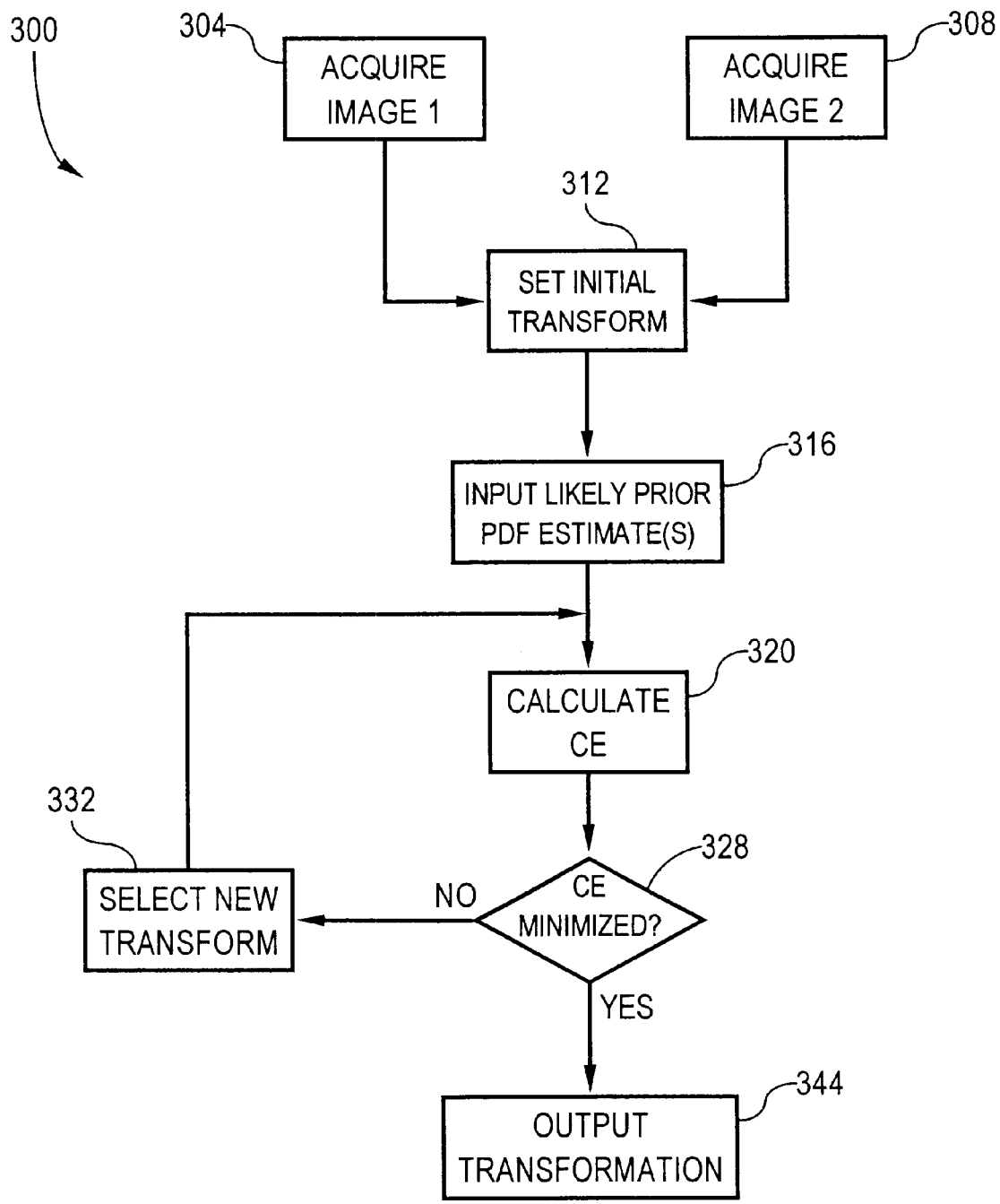
FIGS 3–7 are flow charts outlining image registration methods according to the present invention.
Figure 4:
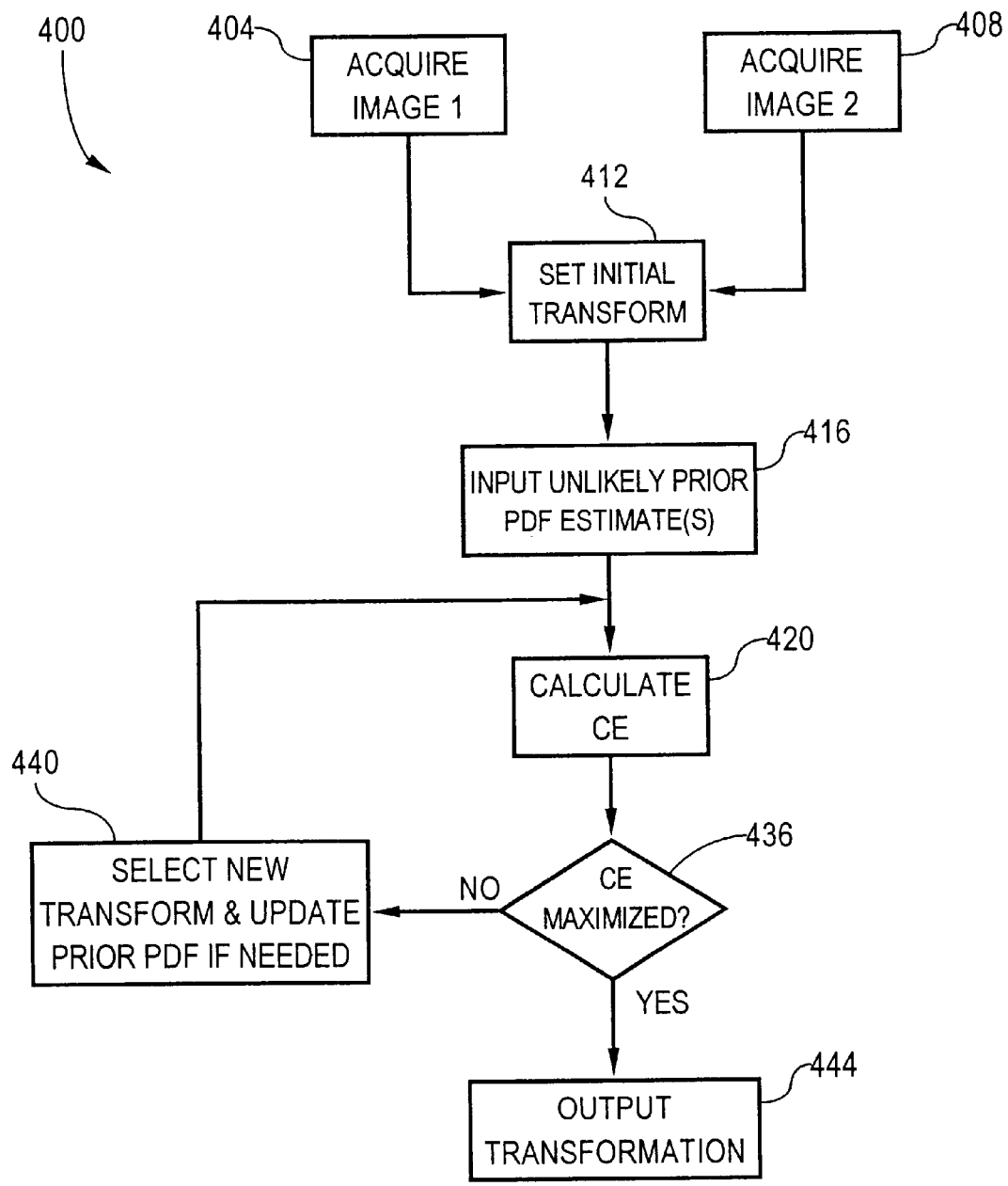
Figure 5:
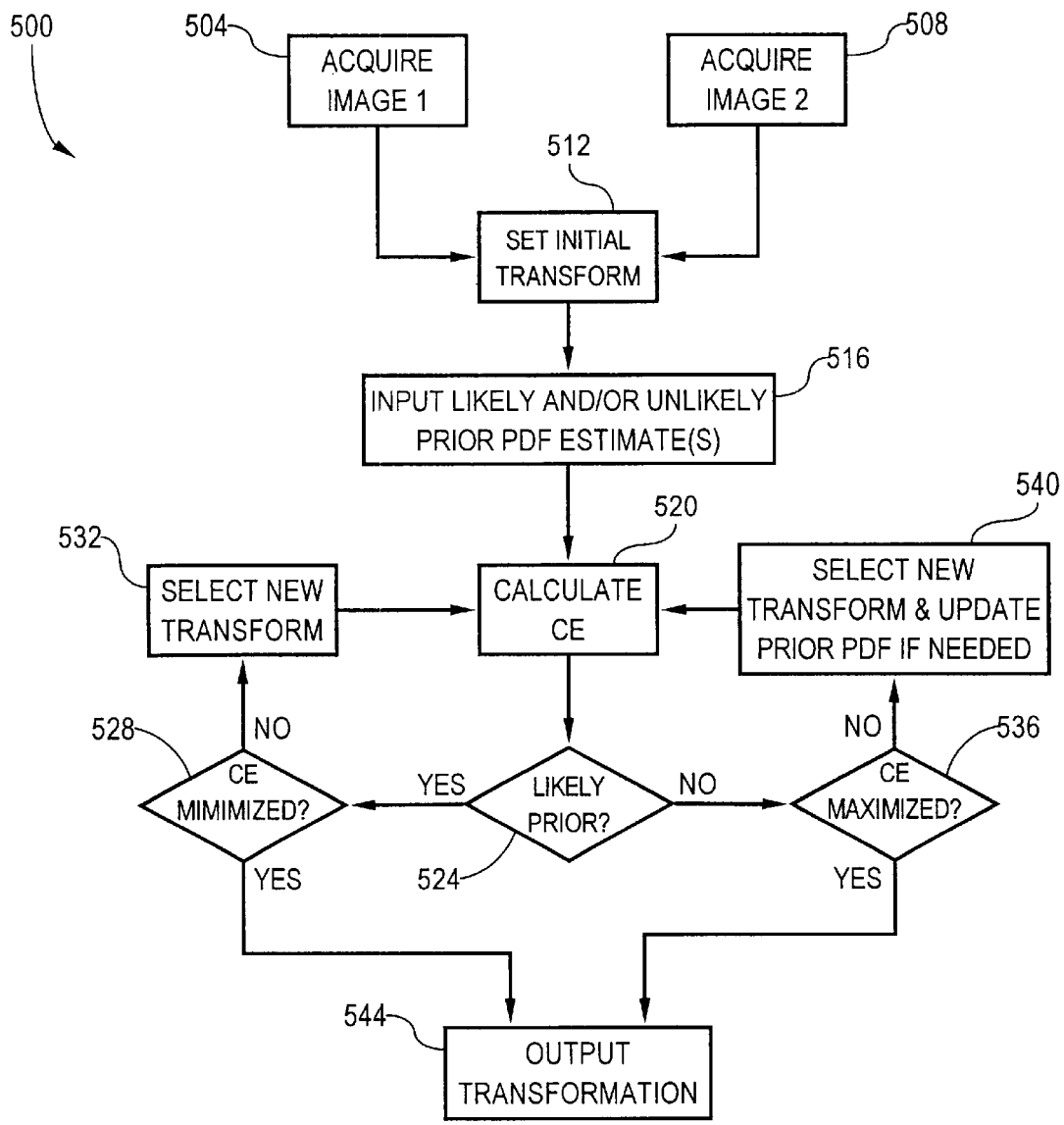

FIGS. 3–5 illustrate exemplary processes 300, 400, and 500 for combining two images using cross-entropy optimization. The processes may be implemented in software as part of an integrated scanner/image processing system, or in a separate image processing system implemented on a standalone computer such as a personal computer, work station, or other type of information handling system. Although the process is described primarily in reference to combining two images, the process can readily be adapted to combining more than two images, for example, by repeating the process in accordance with this teaching serially until all of the images are registered, or, via multi-variate cross-entropy optimization since, as stated above, cross-entropy applies to any dimensional variables.

FIG. 3 is a flow chart illustrating a first exemplary method 300 for registering two images using cross-entropy minimization. Two images to be registered are initially acquired (steps 304 and 308). In step 312, the initial relative orientation of the two images is set in accordance with some prespecified parameters or some initial transform applied to image 2. In step 316, at least one prior estimation of the true pdf that is likely or reasonably close to the unknown true pdf is input, e.g., from the memory 140 (FIG. 1). Again, the images may be of the same or different imaging modalities. The cross-entropy is calculated in step 320 for the current spatial orientation. It is determined in step 328 whether the current spatial orientation yields a minimized cross-entropy.

If a single likely prior pdf estimate is used, the cross-entropy value to be minimized is the cross-entropy calculated in accordance with Eq. 1.

If more than one prior pdf estimate is used, a multiobjective optimization scheme is used. The cross-entropy is calculated in accordance with Eq. 1 for each prior pdf and the values are summed, and the value to be minimized is the sum of the individual cross-entropy values. The sum can be an unweighted sum. Alternatively, a weighted sum can be used, e.g., where it is desired to set the relative emphasis of the prior pdf estimates. Equivalently, the value to be minimized can be an unweighted or weighted average of the individual cross-entropy values.

If a minimized cross-entropy value is not yet obtained, the process proceeds to step 332 and a transform corresponding to a different spatial arrangement is selected in accordance with an optimization algorithm. The pdfs are updated if necessary, e.g., if they are related to the images under study, and the process returns to step 320. Steps 320, 328, and 332 are repeated iteratively until a transform that minimizes the cross-entropy is found. If it is determined that the cross-entropy is minimized (step 328), the transformation parameters yielding the minimized cross-entropy, thus providing an optimal registration, are output (step 344).

FIG. 4 is a flow chart illustrating a second exemplary method 400 for registering two images using cross-entropy maximization. Two images to be registered are initially acquired (steps 404 and 408). In step 412, the initial relative orientation of the two images is set in accordance with some prespecified parameters or some initial transform is applied to image 2. In step 416, one or more prior pdf estimations that are unlikely to be close to the unknown true pdf are input, e.g., from the memory 150 (FIG. 1). The unlikely pdf estimations can be based on the voxel statistics for prior known misregistrations or conditions otherwise known to represent a misalignment of the images. Again, the images may be of the same or different imaging modalities. The cross-entropy is calculated in a step 420 for the current spatial orientation and it is determined in a step 436 whether a spatial orientation yielding a maximized cross-entropy has been found.

If a single unlikely prior pdf estimate is used, the cross-entropy value to be maximized is the cross-entropy calculated in accordance with Eq. 1.

If more than one prior pdf estimate is used, the cross-entropy is calculated in accordance with Eq. 1 for each prior pdf and the values are summed, and the value to be maximized is the sum of the individual cross-entropy values. The sum can be an unweighted sum or, alternatively, a weighted sum can be used, e.g., where it is desired to set the relative emphasis of the prior pdf estimates. Likewise, the value to be maximized can be an unweighted or weighted average of the individual cross-entropy values.

If the cross-entropy has not yet been maximized in step 436, the process proceeds to a step 440 and a transform corresponding to a different spatial arrangement is selected in accordance with an optimization algorithm. The pdfs are updated if necessary, e.g., if they are related to the images under study, and the process returns to step 420. Steps 420, 436, and 440 are iteratively repeated until a transform that maximizes the cross-entropy is found. If it is determined that the cross-entropy is maximized (step 436), the transformation parameters yielding the maximized cross-entropy, thus providing an optimal registration, are output (step 444).

FIG. 5 is a flow chart illustrating a third exemplary method 500 for registering two images using either cross-entropy minimization or cross-entropy maximization. Two images to be registered are initially acquired (steps 504 and 508). In step 512, the initial relative orientation of the two images is set in accordance with some prespecified parameters or some initial transform is applied to image 2. In step 516, one or more prior estimations of the true pdf, that are likely or unlikely, are input, e.g., from the memory 150 (FIG. 1). Again, the images may be of the same or different imaging modalities. The cross-entropy is calculated in a step 520.

Next, in step 524, it is determined whether the prior pdf estimate or estimates are likely or unlikely. If the prior pdf estimate is likely, the process proceeds to step 528 and cross-entropy minimization is used as the optimization scheme. If the current spatial orientation has not been determined to be one that minimizes the cross-entropy (step 528) in accordance with the optimization scheme, the process proceeds to step 532 and a transform corresponding to a different spatial arrangement is selected in accordance with the optimization algorithm. The pdfs are updated if necessary, e.g., if they are related to the images under study, and the process returns to the step 520. Again, in the event that multiple likely prior pdf estimates are used, the sum or average (weighted or unweighted) of the individual cross-entropy values is minimized as described above. Steps 520, 524, 528, and 532 are iteratively repeated until a transform that minimizes the cross-entropy is found. Once it is determined that the cross-entropy is minimized (step 528), the transformation parameters yielding the minimized cross-entropy, thus providing an optimal registration, are output (step 544).

If the prior estimation(s) are unlikely to be close to the true pdf in step 524, the process proceeds to step 536, and cross-entropy maximization is used. It is determined in step 536 whether a spatial orientation yielding a maximized cross-entropy, based on the cross-entropy calculation of step 520, has been found. If the cross-entropy has not yet been maximized, the process proceeds to step 540 and a transform corresponding to a different spatial arrangement is selected in accordance with the optimization algorithm. The pdfs are updated if necessary, e.g., if they are related to the images under study, and the process returns to step 520. Again, where multiple unlikely prior pdf estimates are used, the sum or average (weighted or unweighted) of the individual cross-entropy values is maximized as described above. Steps

520, 524, 536, and 540 are iteratively repeated until a transform that maximizes the cross-entropy is found. If it is determined that the cross-entropy is maximized (step 536), the transformation parameters yielding the maximized cross-entropy, thus providing an optimal registration, are output (step 544).

Figure 6:
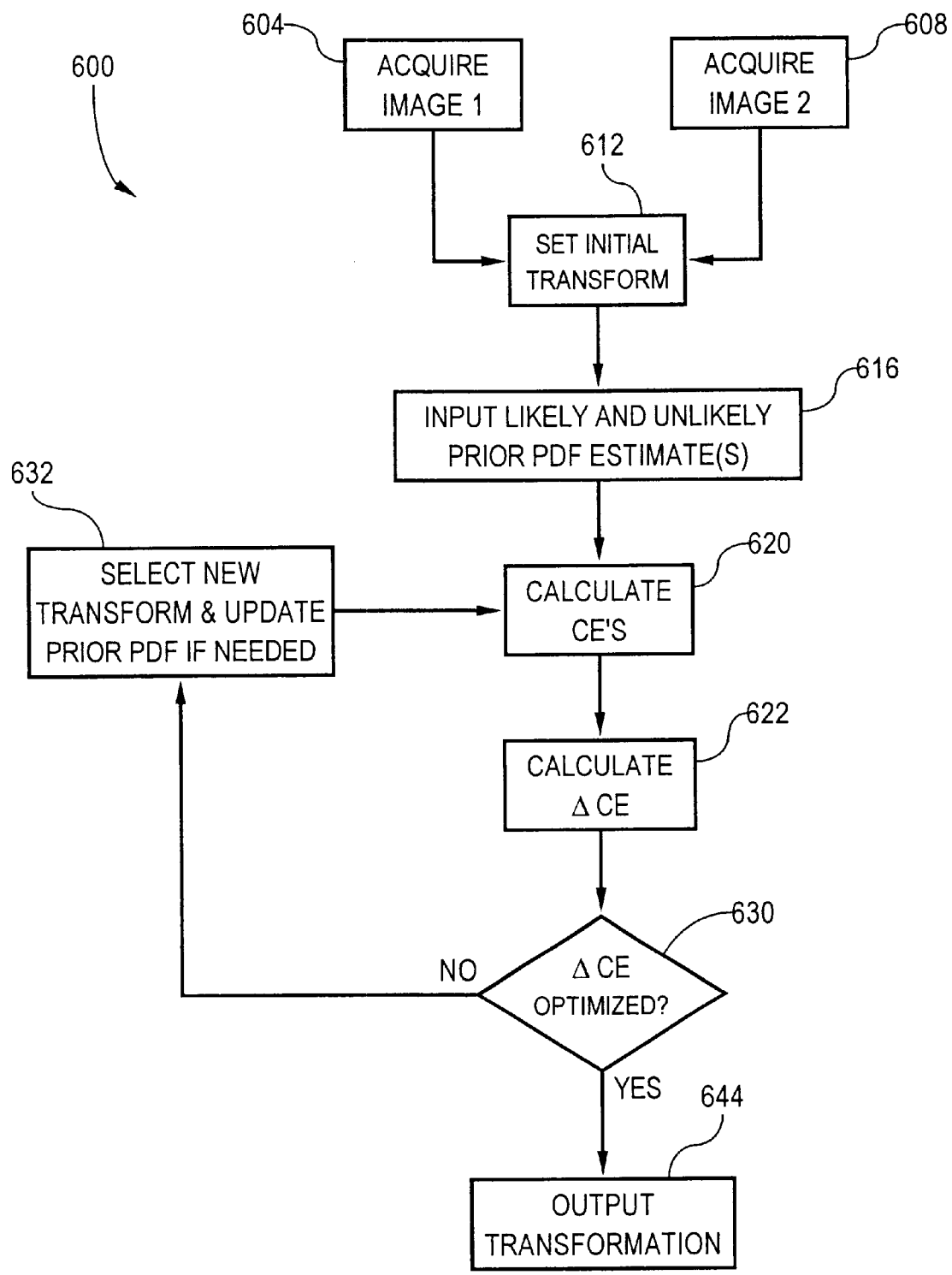

FIG. 6 is a flow chart illustrating a fourth exemplary method 600 for registering two images using both cross-entropy minimization and cross-entropy maximization. Two images to be registered are initially acquired (steps 604 and 608). In step 612, the initial relative orientation of the two images is set in accordance with some prespecified parameters or some initial transform is applied to image 2. In step 616, one or more prior unlikely pdf estimations and one or more likely prior pdf estimations are input, e.g., from the memory 150 (FIG. 1). The likely and unlikely pdf estimations can be based on the voxel statistics for prior known conditions as described above. Again, the images may be of the same or different imaging modalities. The cross-entropies are calculated for each pdf in a step 620 for the current spatial orientation. In step 622, the difference between the cross-entropy value for likely and unlikely prior pdf estimates is calculated and the process proceeds to step 630 for optimization of the cross-entropy difference ($\Delta CE$).

This difference between likely and unlikely cross-entropies, $\Delta CE$, can be calculated in two ways. In the first method, the unlikely cross-entropy value is subtracted from the likely cross-entropy value, i.e., $$\Delta CE = [CE(\text{likely})_1 + \ldots + CE(\text{likely})_n] - [CE(\text{unlikely})_1 + \ldots + CE(\text{unlikely})_m],$$

wherein n and m are integers greater than or equal to one, in the first method, the cross-entropy is optimized by minimizing $\Delta CE$.

In the second method, the likely cross-entropy value is subtracted from the unlikely cross-entropy value, i.e., $$\Delta CE = [CE(\text{unlikely})_1 + \ldots + CE(\text{unlikely})_n] - [CE(\text{likely})_1 + \ldots + CE(\text{likely})_m].$$

and the cross-entropy is optimized by maximizing $\Delta CE$.

In an alternative embodiment, the summed portions may be weighted. In another alternative embodiment a weighted difference is used. In another alternative embodiment, the summed portions may be replaced with weighted or unweighted averages.

After calculating the difference (step 622), the process proceeds to step 630 to determine whether a spatial orientation yielding an optimized cross-entropy has been found, i.e., minimized $\Delta CE$ where the first method described above is used, or maximized $\Delta CE$ where the second method described above is used.

If $\Delta CE$ has not yet been optimized in step 630, the process proceeds to a step 632 and a transform corresponding to a different spatial arrangement is selected in accordance with an optimization algorithm. The pdfs are updated if necessary, e.g., if they are related to the images under study, and the process returns to step 620. Steps 620, 622, 630, and 632 are iteratively repeated until a transform that optimizes $\Delta CE$ is found. If it is determined that $\Delta CE$ is optimized (step 630), the transformation parameters yielding the optimized $\Delta CE$, thus providing an optimal registration, are output (step 644).

Figure 7:
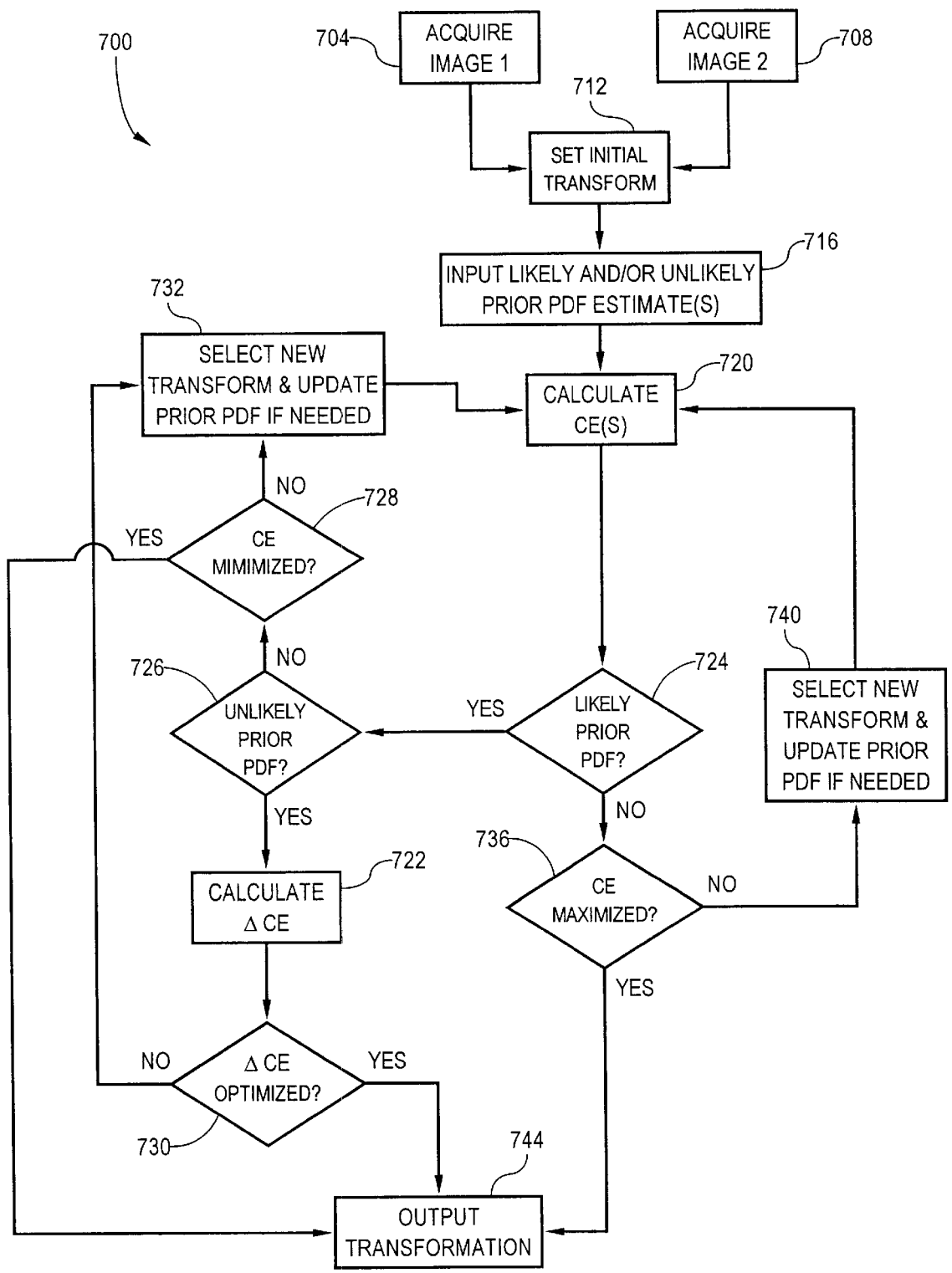

FIG. 7 illustrates a fifth exemplary embodiment 700 in accordance with the present invention which is adaptable to perform each of the processes illustrated in FIGS. 3–6. Two images to be registered are initially acquired (steps 704 and 708). In step 712, the initial relative orientation of the two images is set in accordance with some prespecified parameters or some initial transform applied to image 2. In step 716, one or more likely prior pdf estimates and/or one or more unlikely prior pdf estimates are input, e.g., from the memory 140 (FIG. 1). Again, the images may be of the same or different imaging modalities. The cross-entropy is calculated in step 720 for the current spatial orientation. In step 724, it is determined whether at least one of the prior pdf estimates is a likely prior estimate. If it determined that at least one of the prior pdf estimates is a likely prior estimate, the process proceeds to step 726 and it is determined whether any of the input prior pdf estimates are unlikely estimates. If none of the prior pdf estimates is an unlikely estimate, the process proceeds to step 728, and cross-entropy minimization is used as described in reference to FIG. 3.

If a minimized cross-entropy value (which may be summed or averaged as described above in the case of multiple likely prior pdf estimates) is not yet obtained, the process proceeds to step 732 and a transform corresponding to a different spatial arrangement is selected in accordance with the optimization algorithm. The pdfs are updated if necessary, e.g., if they are related to the images under study, and the process returns to step 720. Steps 720, 726, 728, and 732 are iteratively repeated until a transform that minimizes the cross-entropy is found. If it is determined that the cross-entropy is minimized (step 728), the transformation parameters yielding the minimized cross-entropy, thus providing an optimal registration, are output (step 744).

If, however, there is at least one likely prior pdf estimate (step 724) and one unlikely prior pdf estimate (step 726), the process proceeds to step 722, and $\Delta CE$ is calculated in the manner described above in reference to FIG. 6. After calculating $\Delta CE$ by one of the above-described methods (step 722), the process proceeds to step 730 to determine whether a spatial orientation yielding an optimized cross-entropy has been found.

If $\Delta CE$ has not yet been optimized in step 730, the process proceeds to a step 732 and a transform corresponding to a different spatial arrangement is selected in accordance with an optimization algorithm. The pdfs are updated if necessary, e.g., if they are related to the images under study, and the process returns to the step 720. Steps 720, 724, 726, 722, 730, and 732 are iteratively repeated until a transform that optimizes $\Delta CE$ is found. If it is determined that $\Delta CE$ is optimized (step 730), the transformation parameters yielding the optimized $\Delta CE$, thus providing an optimal registration, are output (step 744).

If, in step 724, it is determined that no prior pdf estimate is a likely estimate, then the pdf estimate or estimates are unlikely estimates and the process proceeds to step 736 and cross-entropy maximization is used as described in reference to FIG. 4.

If a maximized cross-entropy value (which may be summed or averaged as described above in the case of multiple unlikely prior pdf estimates) is not yet obtained, the process proceeds to step 740 and a transform corresponding to a different spatial arrangement is selected in accordance with the optimization algorithm. The pdfs are updated if necessary, e.g., if they are related to the images under study, and the process returns to the step 720. Steps 720, 724, 736, and 740 are iteratively repeated until a transform that maximizes the cross-entropy is found. If it is determined that the cross-entropy is maximized (step 736), the transformation parameters yielding the maximized cross-entropy, thus providing an optimal registration, are output (step 744).

The present invention is illustrated using rigid-body geometric transformations, however, the present invention is applicable to more general transformations, including, for example, nonlinear transformations, affine transformations, warping transformation, and so forth.

For a rigid-body transformation, the registration parameter is a six-dimensional vector, ($\theta_x$, $\theta_y$, $\theta_z$, $t_x$, $t_y$, $t_z$), where $\theta_x$, $\theta_y$, and $\theta_z$ are rotation angles in degrees around the x-, y-, and z-axes, respectively, and $t_x$, $t_y$, and $t_z$ are translational offsets along the x-, y-, and z-axes, respectively. For each rotation, there is a 4×4 matrix corresponding to it in a homogeneous coordinate system. A successive application of the rotation amounts to matrix multiplication. Since in general the matrix multiplication is not commutative, the order of these rotations is important. An Euler rotation is assumed. It is also assumed that the rotation happens before translation.

As stated above, it is necessary to estimate the marginal and joint distribution of gray value pairs in the overlapping volume of the two images. The following illustrates an exemplary method for estimating marginal and joint probabilities.

The maximum voxel value of image f is first found. The voxel values in image f are then divided into $n_f$ discrete levels. Similarly, the voxel values in image g are divided into $n_g$ discrete levels. Here, $n_f$ and $n_g$ can be the same or different. In the overlapping volume under a transformation, the histograms of voxel values in images f and g, and of the voxel pairs are calculated by binning the voxel values and value pairs. The number of bins of the histogram for f is $n_f$, the number of bins of the histogram for g is $n_g$, and the number of bins of the joint histogram is $n_f \times n_g$. The normalized histograms then give the marginal as well as the joint distributions.

After transformation, a grid point in one volume will, in general, not exactly coincide with another grid point in the transformed space. Thus, before binning the voxel values and voxel value pairs, interpolation is performed in order to obtain the voxel value at the grid in the transformed space. There are a number of interpolation methods that can be used, including, but not limited to nearest neighbor, tri-linear, and tri-linear partial volume distribution. Note that the nearest neighbor interpolation is not sufficient to achieve sub-voxel accuracy since it is insensitive to the translation up to one voxel. For simplicity the tri-linear interpolation was performed.

Under a transformation, a multidimensional direction set optimization is used to minimize the negated cross-entropy (i.e., maximize the cross-entropy) if undesirable priors are used, or to minimize the cross-entropy directly if a good prior is available. The direction matrix is initialized to a unitary matrix. The vector is ($\theta_x$, $\theta_y$, $\theta_z$, $t_x$, $t_y$, $t_z$), as explained above. The angles are in degrees and the translations are in mm.

To find a true global optimal value, simulated annealing can be exploited. Simulated annealing has been successfully applied to 2-dimensional image registration. It is a stochastic method and is slow, which limits its application to 3-dimensional image registration. In practice, the multiresolution or subsampling approach proves to be helpful. It can improve the optimization speed, increase the capture range and the algorithm is relatively robust.

The multiresolution optimization is preferred in this implementation. The images are folded down to an 8×8×8 image as the most coarse image. The resolutions of the successive images are doubled until the full image resolution or 64×64×64 is reached in all three dimensions, whichever comes first. Fine resolutions beyond 64×64×64 can be used, but in most cases do not exhibit any sizable improvements on the registration accuracy and there is almost no effect on the success rate. To obtain the coarse images, the voxel values within a sampling volume are averaged. Although it is a little slower than the subsampling approach, in practice it results in a better registration.

When estimating the joint 2-dimensional histogram, the gray values are paired to different bins. Since the joint distribution is estimated by the normalized 2-dimensional histogram, from a statistical point of view, a large sample size is desired. In the multiresolution optimization strategy, when coarse images are used, however, the number of gray value pairs is small. One would expect that the statistical bias is large.

Suppose the image size is 8×8×8. Then there are at most 512 gray value pairs (when all voxels overlap). For 8-bit gray data, the number of bins can be as large as 256. 256 is certainly not good since, on average, there are at most 2 pairs in each bin. The statistical error in the joint probability would render a poor result. In this situation, a smaller number of bins is desirable.

If the number of bins is fixed at a small value, in the fine resolution step, there are enough gray value pairs in each bin. One can have a better estimation of the joint probability at the expense of lower sensitivity. This paradox suggests that fixing the number of bins is not ideal and an adaptive number of bins, i.e., the number of bins changes with the resolution, is better.

In tests, an adaptive number of bins was used. The number of bins was heuristically set to the value of the resolution, i.e., if the resolution is 32, the number of bins is also 32. No attempt was made to optimize the number of bins at each resolution.

EMPIRICAL TESTS

The accuracy and robustness of the cross-entropy optimization methods of the present invention have been demonstrated in the following tests. In particular, both cross-entropy minimization using a reasonable or likely prior estimation and cross-entropy maximization using different undesirable prior estimations are evaluated in this section.

MR/SPECT and CT/PET image pairs were used as test volumes. The test images were primary brain images, with some inclusion of neck and chest.

The image data consisted of slices. The x-axis was directed horizontally from right to left, the y-axis horizontally from front to back, and the z-axis vertically from bottom to top.

Image pair 1 (MR/SPECT): The MR image (T1 sagittal) had a size of 256×256×128 voxels with a voxel size of 1.0×1.0×1.5 mm$^3$. The minimum voxel value was 0 and the maximum voxel value was 504. Technetium-99m hexamethyl-propyleneamine-oxime (Tc-99m HMPAO) was used as the pharmaceutical for the SPECT image acquisition. The SPECT image had a size of 64×64×24 voxels with a voxel size of 7.12×7.12×7.12 mm$^3$. The minimum voxel value was 0 and the maximum voxel value was 5425.

Image pair 2 (CT/PET): The CT image had a size of 512×512×31 voxels with a voxel size of 0.47×0.47×4.99 mm$^3$. The minimum voxel value was 0 and the maximum voxel value was 819. The CT image was rescaled to accommodate the display characteristics on a nuclear workstation. F$^{18}$ was used as the pharmaceutical for the PET image acquisition. The PET image had a size of 128×128×127 voxels with a voxel size of 2.34×2.34×2.34 mm$^3$. The minimum voxel gray value was 0 and the maximum voxel value was 745.

In all experiments, MR or CT images were used as a reference and the SPECT or PET as a floating image, i.e., they were transformed to the space of the MR or CT images.

For the multimodality registration, the correct registration parameters are unknown. Various evaluation methods have been used to assess registration accuracy, including phantom validation, observer assessment, and fiducial marks, among others. Here a modified observer assessment approach was used.

Those image pairs were first registered by four clinical experts using an interactive (manual) software registration method. The standard deviations of those four independent registration results for each image pairs are, in a vector (i.e., $(\theta_x, \theta_y, \theta_z, t_x, t_y, t_z)$) form: image pair 1 (MR/SPECT): (3.48, 0.53, 3.11, 1.68, 2.98, 1.83); and image pair 2 (CT/PET): (2.71, 0, 0, 1.45, 4.36, 3.93). Again, the angles are in degrees and the translations are in mm. Despite the disparity among the clinicians' registrations, the average of their registration parameters were used as the standard, and the registration results of the cross-entropy optimizations were compared against those standard results.

To assess the robustness of the present method, three sets of misregistrations were randomly generated as initial registrations for each image pair. In the first set of 50 misregistrations (Set 1), the differences between the rotation angles and the standard rotation angles were uniformly distributed over −10 to 10 degrees and the differences between the translational offsets were uniformly distributed between −10 to 10 mm. For the second set of 50 misregistrations (Set 2), the distributions were uniformly distributed over −20 to 20 degrees and the differences between the translational offsets were uniformly distributed between −20 to 20 mm. For the third set of 50 misregistrations (Set 3), the distributions were uniformly distributed over −30 to 30 degrees and the differences between the translational offsets were uniformly distributed between −30 to 30 mm.

It has been reported that clinicians can detect the registration parameter differences by 4° in the x and y rotation angles, 2° in the z-rotation angle, 2 mm in the x and y translations, and 3 mm in the z translation angle. Since the true registration parameters were unknown, large thresholds were set, for the differences between the computed ones and the standard when judging whether a registration was successful. The thresholds were set to twice the detection thresholds set forth above, i.e., 8° in x and y rotation angles, 4° in the z rotation angle, 4 mm in the x and y translations, and 6 mm in z translation, so that there was a fair amount of coverage of the "true" parameters.

The algorithms maximizing cross-entropy given in Eqs. 6 and 7 are denoted by bit patterns 0011 and 0111, respectively. For comparison, the mutual information maximization is denoted as 0100.

Cross-Entropy Maximization

The statistics of the misregistration parameters are tabulated in TABLES 1 and 2, for two image pairs under three sets of misregistrations, where a misregistration is defined as the difference between the actual registration result and the standard one. The angles are in degrees, translation offsets in mm, and the time in seconds.

TABLE 1

Average and standard deviation of the misregistration parameters for the MR/SPECT image pair.

| Algorithm | $\theta_x$ | $\theta_y$ | $\theta_z$ | $t_x$ | $t_y$ | $t_z$ | Time | Success |
|---|---|---|---|---|---|---|---|---|
| Set 1: | | | | | | | | |
| 0100 | −2.30 ± 0.48 | 3.68 ± 0.42 | 2.81 ± 0.43 | 0.95 ± 0.26 | 0.22 ± 0.40 | −3.33 ± 0.59 | 52.8 ± 7.0 | 100% |
| 0011 | 0.65 ± 0.38 | 3.76 ± 0.35 | 2.95 ± 0.30 | 1.08 ± 0.16 | −1.61 ± 0.29 | 4.35 ± 0.30 | 46.1 ± 10.3 | 94% |
| 0111 | −0.85 ± 0.79 | 3.75 ± 0.52 | 2.98 ± 0.47 | 1.05 ± 0.28 | −0.63 ± 0.64 | −3.53 ± 0.83 | 58.2 ± 14.8 | 100% |
| Set 2: | | | | | | | | |
| 0100 | −2.20 ± 0.44 | 3.80 ± 0.55 | 2.90 ± 0.46 | 1.02 ± 0.28 | 0.17 ± 0.43 | −3.36 ± 0.54 | 57.8 ± 10.8 | 100% |
| 0011 | 0.80 ± 0.47 | 3.93 ± 0.45 | 2.99 ± 0.44 | 1.13 ± 0.21 | −1.66 ± 0.36 | 4.41 ± 0.31 | 49.6 ± 9.6 | 96% |
| 0111 | −0.21 ± 0.67 | 3.74 ± 0.45 | 2.92 ± 0.40 | 1.04 ± 0.21 | −1.23 ± 0.37 | 4.21 ± 0.29 | 52.1 ± 10.3 | 94% |
| Set 3: | | | | | | | | |
| 0100 | −2.27 ± 0.61 | 3.79 ± 0.45 | 2.92 ± 0.40 | 1.03 ± 0.27 | 0.21 ± 0.57 | −3.30 ± 0.70 | 64.2 ± 17.0 | 98% |
| 0011 | 0.70 ± 0.61 | 3.78 ± 0.47 | 2.91 ± 0.52 | 1.07 ± 0.22 | −1.67 ± 0.45 | −4.43 ± 0.36 | 57.8 ± 21.9 | 86% |
| 0111 | −0.22 ± 0.73 | 3.82 ± 0.40 | 2.97 ± 0.42 | 1.08 ± 0.20 | −1.15 ± 0.37 | −4.17 ± 0.27 | 56.0 ± 17.3 | 92% |

TABLE 2

Average and standard deviation of the misregistration parameters for the CT/PET image pair.

| Algorithm | $\theta_x$ | $\theta_y$ | $\theta_z$ | $t_x$ | $t_y$ | $t_z$ | Time | Success |
|---|---|---|---|---|---|---|---|---|
| Set 1: | | | | | | | | |
| 0100 | −3.50 ± 1.93 | 0.23 ± 0.78 | 0.54 ± 0.86 | 1.17 ± 1.24 | −1.88 ± 2.23 | 0.18 ± 1.13 | 54.0 ± 7.9 | 8% |
| 0011 | −2.40 ± 1.23 | 0.07 ± 0.46 | −0.78 ± 1.27 | 0.98 ± 0.80 | 1.38 ± 1.48 | 1.26 ± 0.21 | 34.7 ± 5.6 | 40% |
| 0111 | −3.27 ± 1.33 | −0.11 ± 0.63 | −0.35 ± 1.28 | 1.17 ± 1.20 | −0.29 ± 1.84 | 1.06 ± 0.43 | 35.5 ± 5.3 | 80% |
| Set 2: | | | | | | | | |
| 0100 | −4.72 | 0.07 | 2.81 | 2.63 | −3.38 | 0.09 | 57.0 | 2% |
| 0011 | −2.65 ± 1.04 | 0.10 ± 0.66 | −1.36 ± 1.63 | 0.61 ± 1.29 | 1.07 ± 1.52 | 1.34 ± 0.37 | 40.3 ± 7.8 | 28% |
| 0111 | −3.13 ± 1.67 | 0.10 ± 0.71 | −0.27 ± 1.45 | 0.91 ± 1.00 | −0.04 ± 2.16 | 1.28 ± 0.74 | 44.4 ± 10.0 | 58% |

TABLE 2-continued

Average and standard deviation of the misregistration parameters for the CT/PET image pair.

| Algorithm | $\theta_x$ | $\theta_y$ | $\theta_z$ | $t_x$ | $t_y$ | $t_z$ | Time | Success |
|---|---|---|---|---|---|---|---|---|
| Set 3: | | | | | | | | |
| 0100 | −3.70 ± 1.73 | −1.16 ± 0.10 | 0.34 ± 2.03 | 3.26 ± 0.46 | −2.40 ± 1.35 | 1.14 ± 0.07 | 73.5 ± 43.1 | 4% |
| 0011 | −2.80 ± 1.48 | 0.00 ± 1.10 | −1.47 ± 1.45 | 0.57 ± 1.89 | 0.58 ± 1.94 | 1.42 ± 0.31 | 43.0 ± 13.8 | 18% |
| 0111 | −2.76 ± 1.24 | 0.10 ± 0.49 | −0.97 ± 1.01 | 0.77 ± 0.84 | 0.19 ± 1.41 | 0.79 ± 0.65 | 45.3 ± 10.8 | 46% |

For the MR/SPECT image pair, the success rates for the three criteria were comparable. Although some speed difference of these criteria is seen, it is not significant. All of these techniques showed systematic and reasonable deviations from the manual registration. The rotation angle differences around the x- and y-axes and the translation differences along the x- and y-axes were less than the detection thresholds of a trained clinician. Other differences were just a bit larger than the detection thresholds. The registration parameters were consistent across these three algorithms. The difference of x-rotation angles was about 3 degrees, the y- and z-translation differences were about 2 mm and 1 mm respectively. There was almost no differences in the y- and z-rotation angles and in the x-translation. Nevertheless, the registration parameters produced by 0111 are some compromised values of those given by 0100 and 0011 which is understandable since the 0111 criterion is made up of those of 0100 and 0011. Considering the relatively large voxel size, this accuracy is acceptable.

For the CT/PET image pair, the success rates of 0011 and 0111 consistently outperformed that of mutual information. The mutual information method was the slowest. Since the mutual information method had high failure rate, the statistics on it have a low confidence. In particular, mutual information only succeeded once in Set 2 and thus standard deviation for Set 2 is not included in TABLE 2. Again, these algorithms show systematic and reasonable deviations from the manual registration. All the differences are less than the detection thresholds of a trained technician except the mutual information cases where the success rate is low. The registration parameters are also consistent across them. The differences in x-, y-, and z-rotation angles and in x-, y-, and z-translations are about 2, 1, 2 degrees and 2, 3, and 1.5 mm, respectively.

Cross-Entropy Minimization

If one has a good estimation of the joint voxel value distribution, then cross-entropy can be minimized to find the optimal registration. Although a reasonably good prior estimation is, in practice, generally hard to obtain, the results here validate the technique. The experiment was performed on image pair 1 (MR/SPECT) only.

The joint voxel value distribution was calculated under the averaged manual registration parameters. This distribution was then used as the prior. As one may expect, this distribution has a lot of zero components which can cause trouble in cross-entropy computation during the optimization process. For example, if prior distribution is zero and the joint distribution is not zero, the cross-entropy is infinite. To cope with this situation, one can assign a large value to the cross-entropy under this situation. When picking such a large value, the stop condition of the optimization process should be taken into account. If the assigned value is too large, then the optimization can prematurely terminate. Here, such terms were ignored, which amounted to setting that value to 0. Ideally one should penalize them. If they are penalized using some positive value, then cross-entropy minimization has a small capture range.

TABLE 3 lists the average and standard deviation of the misregistration parameters. The angles are in degrees, translation offsets in mm, and the time in seconds. As TABLE 3 reveals, the registration parameters were very close to those of the manual results and the differences of these registration parameters were well below the detection threshold of a trained technician, which is expected since the prior was calculated based on the manual registration results. This implementation of this minimization process can be further optimized, e.g., by using Paren density estimation with a Gaussian kernel to add some smoothness and stability to the cross-entropy function.

TABLE 3

MR/SPECT pair registration by cross-entropy minimization.

| Set | $\theta_x$ | $\theta_y$ | $\theta_z$ | $t_x$ | $t_y$ | $t_z$ | Time | Success |
|---|---|---|---|---|---|---|---|---|
| 1 | −0.41 ± 1.27 | 0.46 ± 1.59 | −0.30 ± 1.14 | 0.12 ± 0.85 | 0.24 ± 0.81 | −0.10 ± 0.22 | 114.4 ± 25.4 | 78% |
| 2 | 0.13 ± 1.13 | 0.57 ± 2.12 | −0.13 ± 1.13 | 0.08 ± 0.97 | −0.09 ± 0.90 | −0.14 ± 0.38 | 125.4 ± 20.0 | 68% |
| 3 | 0.57 ± 2.16 | 0.08 ± 1.78 | −0.42 ± 1.49 | −0.15 ± 0.75 | −0.25 ± 1.44 | −0.21 ± 0.35 | 132.1 ± 25.8 | 44% |

There has thus been described an image processing system and method employing image registration using cross-entropy optimization to find an optimal registration of two images. The experimental results indicate that the present cross-entropy optimization technique has comparable, and in some cases better, accuracy and robustness than that of the mutual information :maximization approach.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory of one or more computer systems. Until required by the computer system, the set of instructions may be stored in another computer readable memory, for example in a hard disk drive or in a removable memory such as an optical disk for utilization in a CD-ROM or DVD drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by a user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically, or holographically, so that the medium carries computer readable information.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or their equivalents.

Having thus described the preferred embodiments, the invention is now claimed to be:

1. A method for registering a first volumetric image and a second volumetric image, each image comprising a three-dimensional array of gray scale voxel values, and each image having a marginal probability density function (pdf) of voxel values, the method comprising:
   (a) determining one or more prior joint voxel value probability density functions for the first and second images to provide a corresponding one or more prior pdf estimates including at least one prior unlikely pdf estimate selected from a group consisting of:
      a uniform distribution, and
      an unlikely pdf estimate that is proportional to the marginal pdf of one of the first and second images;
   (b) selecting a first transform defining a geometric relationship of the second image relative to the first image;
   (c) calculating a measure of the cross-entropy for the geometric relationship using the one or more prior pdf estimates;
   (d) selecting a different transform defining a geometric relationship of the second image relative to the first image; and
   (e) iteratively repeating steps (c) and (d) until an optimal transform is calculated, the optimal transform corresponding to a geometric relationship providing an optimized measure of the cross-entropy.

2. The method of claim 1, further including the step of storing data representative of the optimal transform.

3. The method of claim 1, further including the step of registering the first and second images using the optimal transform.

4. The method of claim 3, further including the step of displaying a composite image formed from the registered first and second images.

5. The method of claim 1, wherein the number of prior pdf estimates is one.

6. The method of claim 5, wherein the optimized measure of the cross-entropy is a maximized measure of the cross-entropy.

7. The method of claim 1, wherein the optimal transform is a rigid-body transform.

8. The method of claim 1, wherein at least one of the prior pdf estimates is an unlikely pdf estimate that is a uniform distribution.

9. The method of claim 1, wherein at least one of the prior pdf estimates is an unlikely pdf estimate that is the product of the marginal probability density functions.

10. The method of claim 1, wherein at least one of the prior pdf estimates is an unlikely pdf estimate that is proportional to the marginal pdf of one of the first and second images.

11. The method of claim 10, wherein:
    at least one prior pdf estimate is an unlikely pdf estimate that is proportional to a marginal pdf of the first image;
    at least one prior pdf estimate is an unlikely pdf estimate that is proportional to a marginal pdf of the second image; and
    the measure of the cross-entropy that is optimized is the sum of (1) the cross-entropy calculated using the at least one prior pdf estimate proportional to the marginal pdf of the first image and (2) the cross-entropy calculated using the at least one prior pdf estimate proportional to the marginal pdf of the second image.

12. The method of claim 10, wherein:
    at least one prior pdf estimate is the product of the marginal probability density functions of the first and second images;
    at least one prior pdf estimate is proportional to the marginal pdf of the first image;
    at least one prior pdf estimate is proportional to the marginal pdf of the second image; and
    the measure of the cross-entropy that is optimized is the sum of (1) the cross-entropy calculated using the at least one prior pdf estimate that is the product of marginal pdf's, (2) the cross-entropy calculated using the at least one prior pdf estimate proportional to the marginal pdf of the first image, and (3) the cross-entropy calculated using the at least one prior pdf estimate proportional to the marginal pdf of the second image.

13. A method for registering a first volumetric image and a second volumetric image, each image comprising a three-dimensional array of gray scale voxel values, and each image having a marginal probability density function (pdf) of voxel values, the method comprising:
    (a) determining one or more prior joint voxel value probability density functions for the first and second images to provide a corresponding one or more prior likely pdf estimates;
    (b) selecting a first transform defining a geometric relationship of the second image relative to the first image;
    (c) calculating a measure of the cross-entropy for the geometric relationship using the one or more prior likely pdf estimates;
    (d) selecting a different transform defining a geometric relationship of the second image relative to the first image; and
    (e) iteratively repeating steps (c) and (d) until a minimized measure of the cross-entropy is calculated.

14. A method for registering a first volumetric image and a second volumetric image, each image comprising a three-dimensional array of gray scale voxel values, and each image having a marginal probability density function (pdf) of voxel values, the method comprising:
    (a) determining at least two prior joint voxel value probability density functions for the first and second images to provide a corresponding at least two prior pdf estimates;
    (b) selecting a first transform defining a geometric relationship of the second image relative to the first image;

(c) calculating a measure of the cross-entropy for the geometric relationship using the at least two prior pdf estimates;

(d) selecting a different transform defining a geometric relationship of the second image relative to the first image; and (e) iteratively repeating steps (c) and (d) until an optimal transform is calculated, the optimal transform corresponding to a geometric relationship providing an optimized measure of the cross-entropy.

15. The method of claim 14, wherein each of the at least two prior pdf estimates is a likely pdf estimate and wherein the optimized measure of the cross-entropy is a minimized measure of the cross-entropy, the step of calculating a measure of the cross-entropy comprising:

using each prior pdf estimate to calculate an individual cross-entropy value; and calculating a sum of the individual cross-entropy values.

16. The method of claim 14, wherein each of the at least two prior pdf estimates is an unlikely pdf estimate and wherein the optimized measure of the cross-entropy is a maximized measure of the cross-entropy, the step of calculating a measure of the cross-entropy comprising:

using each prior pdf estimate to calculate an individual cross-entropy value; and calculating a sum of the individual cross-entropy values.

17. The method of claim 14, wherein one or more of the prior pdf estimates are likely pdf estimates, and wherein one or more of the prior pdf estimates are unlikely pdf estimates, the step of calculating a measure of the cross-entropy comprising:

using each prior pdf estimate to calculate an individual cross-entropy;

calculating a first sum, the first sum being the sum of the individual cross-entropies for the one or more likely pdf estimates;

calculating a second sum, the second sum being the sum of the individual cross-entropies for the one or more unlikely pdf estimates; and calculating the difference between the first and second sums.

18. The method of claim 17, wherein the difference is calculated by subtracting the second sum from the first sum, and further wherein the optimized measure of the cross-entropy is a minimized measure of the cross-entropy.

19. The method of claim 17, wherein the difference is calculated by subtracting the first sum from the second sum, and further wherein the optimized measure of the cross-entropy is a maximized measure of the cross-entropy.

20. An image processing system for registering a first volumetric image and a second volumetric image, each image comprising a three-dimensional array of gray scale voxel values, the image processing system comprising:

a registration processor and associated memory for storing a plurality of volumetric image representations to be registered, the registration processor:

determining one or more prior joint probability density functions for the first and second images to provide a corresponding one or more prior probability density function (pdf) estimates, calculating a measure of the cross-entropy for a plurality of geometric relationships between the first and second images using the one or more prior pdf estimates, and from the cross-entropy, finding an optimal transform defining a geometric relationship between the first and second images;

a memory coupled to the registration processor for storing parameters representative of the optimal transform;

a display system for forming a composite image representation from the first and second images; and a memory for storing prior joint probability statistics for one or more spatial arrangements of the first and second images.

21. The image processing system of claim 20, further comprising a diagnostic imaging scanner.

22. The image processing system of claim 20, wherein the diagnostic imaging scanner comprises an MR scanner, an x-ray CT scanner, and PET scanner, a SPECT scanner, an ultrasound scanner, or a combination thereof.

23. The image processing system of claim 20, further including a display on which a composite image of the first and second images is displayed.

24. An article of manufacture comprising a computer useable medium having a computer readable code embodied in the medium for registering a first volumetric image and a second volumetric image, each image comprising a three-dimensional array of gray scale voxel values, the computer readable program code in the article of manufacture comprising:

(a) computer readable programming code means for determining one or more prior joint probability density functions for the first and second images to provide a corresponding one or more prior probability density function (pdf) estimates including at least one of:
a likely prior pdf estimate, and
at least two prior pdf estimates;

(b) computer readable programming code means for selecting a first transform defining a geometric relationship of the second image relative to the first image;

(c) computer readable programming code means for calculating a measure of the cross-entropy for the geometric relationship using the one or more prior pdf estimates;

(d) computer readable programming code means for selecting a different transform defining a geometric relationship of the second image relative to the first image; and (e) computer readable programming code means for iteratively repeating steps (c) and (d) until an optimal transform is calculated, the optimal transform corresponding to a geometric relationship providing an optimized measure of the cross-entropy.

* * * * *